United States Patent
Kim et al.

(10) Patent No.: US 11,296,836 B2
(45) Date of Patent: *Apr. 5, 2022

(54) METHOD FOR TRANSMITTING AND RECEIVING SIGNAL BASED ON LTE AND NR IN WIRELESS COMMUNICATION SYSTEM AND APPARATUS THEREFOR

(71) Applicant: LG Electronics Inc., Seoul (KR)

(72) Inventors: Youngtae Kim, Seoul (KR); Yunjung Yi, Seoul (KR); Jaehyung Kim, Seoul (KR); Duckhyun Bae, Seoul (KR); Inkwon Seo, Seoul (KR); Suckchel Yang, Seoul (KR); Hyunho Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

This patent is subject to a terminal disclaimer.

(21) Appl. No.: 16/786,456

(22) Filed: Feb. 10, 2020

(65) Prior Publication Data

US 2020/0177329 A1 Jun. 4, 2020

Related U.S. Application Data

(63) Continuation of application No. 16/318,091, filed as application No. PCT/KR2018/008905 on Aug. 6, 2018, now Pat. No. 10,560,230.

(60) Provisional application No. 62/566,569, filed on Oct. 2, 2017, provisional application No. 62/541,106, filed on Aug. 4, 2017.

(51) Int. Cl.
*H04L 5/00* (2006.01)
*H04W 76/15* (2018.01)
(Continued)

(52) U.S. Cl.
CPC ....... *H04L 5/0005* (2013.01); *H04W 72/1284* (2013.01); *H04W 74/0833* (2013.01); *H04W 76/15* (2018.02); *H04W 74/006* (2013.01)

(58) Field of Classification Search
None
See application file for complete search history.

(56) References Cited

U.S. PATENT DOCUMENTS 10,165,565 B2 12/2018 Sun
10,560,230 B2* 2/2020 Kim ............... H04L 5/0053
(Continued)

FOREIGN PATENT DOCUMENTS

GB 2563453 A 12/2018
KR 101432692 8/2014

OTHER PUBLICATIONS

Extended European Search Report in European Application No. 18826906.2, dated Feb. 13, 2020, 6 pages.

(Continued)

*Primary Examiner* — Brian S Roberts
(74) *Attorney, Agent, or Firm* — Fish & Richardson P.C.

(57) ABSTRACT

The present invention relates to a method for an NR (New Radio Access Technology) user equipment to transmit and receive a signal in a wireless communication system and an apparatus therefor. The method comprises the steps of checking a PDCCH (Physical Downlink Control Channel) order and, if the PDCCH order is checked, initiating a random access procedure. In this case, if a first uplink carrier and a second uplink carrier are configured, the random access procedure is configured to transmit a random access preamble via a specific uplink carrier corresponding to an indicator associated with the PDCCH order among the first uplink carrier and the second uplink carrier.

6 Claims, 10 Drawing Sheets

(51) Int. Cl.
*H04W 72/12* (2009.01)
*H04W 74/08* (2009.01)
*H04W 74/00* (2009.01)

(56) References Cited

U.S. PATENT DOCUMENTS

| | | | |
|---|---|---|---|
| 10,999,022 B2* | 5/2021 | Kim | .................. H04L 5/0005 |
| 2016/0100429 A1 | 4/2016 | Bostrom et al. | |
| 2017/0332404 A1* | 11/2017 | Wang | .................. H04W 74/06 |
| 2019/0089498 A1 | 3/2019 | Pelletier | |
| 2019/0165905 A1 | 5/2019 | Kim et al. | |

OTHER PUBLICATIONS

Huawei, HiSilicon, "Overview of NR UL for LTE-NR coexistence," RI-1709979, 3GPP TSG RAN WG 1 NR Ad Hoc Meeting, Qingdao, China, dated Jun. 27-30, 2017, 12 pages, XP051299204.

LG Electronics, "Remaining details on UL sharing between LTE and NR," R1-1710354, 3GPP TSG RAN WG1 Meeting Ad-Hoc, Qingdao, P.R. China, dated Jun. 27-30, 2017, 6 pages, XP051299568.

CATT, "Support of UL carrier sharing between NR-LTE," R1-1707528, 3GPP TSG RAN WG1 Meeting #89, Hangzhou, P.R. China, May 15-19, 2017, 3 pages.

CMCC, "Discussion on UL sharing of NR and LTE," R1-1708403, 3GPP TSG RAN WG1 Meeting #89, Hangzhou, P.R. China, May 15-19, 2017, 3 pages.

Nokia, Alcatel-Lucent Shanghai Bell, "NR-LTE sharing of uplink carrier frequency," R1-1709001, 3GPP TSG-RAN WG1#89, Hangzhou, P.R. China, May 15-19, 2017, 6 pages.

ZTE, "Discussion on resources selection for PRACH triggered by a PDCCH order in eNB-loT," R2-1705417, 3GPP TSG-RAN WG2 Meeting#98, Hangzhou, China, May 15-19, 2017, 4 pages.

United States Office Action in U.S. Appl. No. 16/786,470, dated Aug. 31, 2020, 9 pages.

NEC, "Discussion on UL sharing of NR and LTE," R1-1710250, Presented at 3GPP TSG RAN WG1 Meeting NR Ad-Hoc#2, Qingdao, P.R. China Jun. 27-30, 2017, 3 pages.

NEC, "RACH Procedure towards SUL Carrier," R1-1717154, Presented at 3GPP TSG-RAN WG1 Meeting #90bis, Prague, Czech Republic, Oct. 9-13, 2017, 2 pages.

* cited by examiner (A) CONTROL-PLANE PROTOCOL STACK (B) USER-PLANE PROTOCOL STACK

METHOD FOR TRANSMITTING AND RECEIVING SIGNAL BASED ON LTE AND NR IN WIRELESS COMMUNICATION SYSTEM AND APPARATUS THEREFOR

CROSS-REFERENCE TO RELATED APPLICATIONS

This application is a continuation of U.S. application Ser. No. 16/318,091, filed on Jan. 15, 2019, now allowed, which is a National Stage application under 35 U.S.C. § 371 of International Application No. PCT/KR2018/008905, filed on Aug. 6, 2018, which claims the benefit of U.S. Provisional Application No. 62/566,569, filed on Oct. 2, 2017, and U.S. Provisional Application No. 62/541,106, filed on Aug. 4, 2017. The disclosures of the prior applications are incorporated by reference in their entirety.

TECHNICAL FIELD

The present invention relates to a wireless communication system, and more particularly, to a method of transmitting and receiving a signal based on LTE and NR in a wireless communication system and an apparatus therefor.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

As more communication devices require greater communication capacity, the necessity for mobile broadband communication which is enhanced compared to a legacy radio access technology is emerging. And, massive MTC (Machine Type Communication), which provides various services at any time and any place by connecting a plurality of devices and objects, is also one of main issues to be considered in next generation communication. Moreover, discussion on designing a communication system considering a service/UE sensitive to reliability and latency is in progress.

In particular, discussion on introducing a next generation wireless access technology considering the enhanced mobile broadband communication, the massive MTC, the URLLC (Ultra-Reliable and Low Latency Communication), and the like is in progress. In the present invention, for clarity, the next generation wireless access technology is referred to as NR.

SUMMARY

Based on the aforementioned discussion, the present invention intends to propose a method of transmitting and receiving a signal based on LTE and NR in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of transmitting and receiving a signal, which is transmitted and received by an NR (New Radio Access Technology) terminal in a wireless communication system, includes the steps of receiving a PDCCH (Physical Downlink Control CHannel) order on a downlink carrier, and transmitting a random access preamble in response to the PDCCH order. In this case, the random access preamble is transmitted on a first uplink carrier determined based on information on an uplink carrier included in the PDCCH order when a predetermined condition is satisfied, the predetermined condition comprises a plurality of uplink carrier including the first uplink carrier are configured for the downlink carrier, and a cell ID (Identification) of the downlink carrier and a cell ID of the plurality of uplink carrier are identical.

Moreover, the plurality of uplink carrier comprises a second uplink carrier, and the second uplink carrier is supplemental uplink carrier related with LTE (Long Term Evolution) band additionally assigned to the NR terminal.

Moreover, the random access preamble is transmitted via subcarrier spacing identical to a random access preamble transmission initiated by a higher layer when the first uplink carrier and the second uplink carrier are not configured.

Moreover, the method can further include the step of configuring at least one of a time resource and a frequency resource to perform uplink transmission. Or, the method can further include the step of receiving parameters to perform uplink transmission.

Moreover, the PDCCH order can be received using downlink (DL) control information.

To further achieve these and other advantages and in accordance with the purpose of the present invention, according to a different embodiment, an NR (New Radio Access Technology) terminal in a wireless communication system includes an RF (radio frequency) unit, and a processor connected with the RF unit, the processor configured to control the RF unit to receive a PDCCH (Physical Downlink Control Channel) order on a downlink carrier, and control the RF unit to transmit a random access preamble in response to the PDCCH order. In this case, the random access preamble is transmitted on a first uplink carrier determined based on information on an uplink carrier included in the PDCCH order when a predetermined condition is satisfied, the predetermined condition comprises a plurality of uplink carrier including the first uplink carrier are configured for the downlink carrier, and a cell ID (Identification) of the downlink carrier and a cell ID of the plurality of uplink carrier are identical.

According to embodiments of the present invention, it is able to efficiently transmit and receive a signal based on LTE and NR in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

A 3rd generation partnership project long term evolution (3GPP LTE) (hereinafter, referred to as 'LTE') communication system which is an example of a wireless communication system to which the present invention can be applied will be described in brief.

Figure 1:
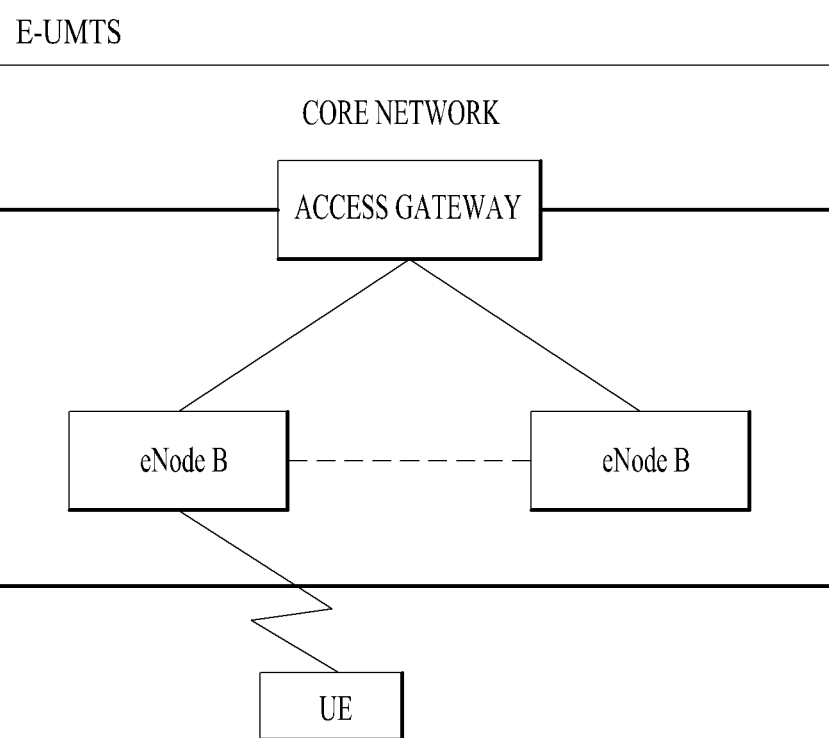
FIG. 1 is a schematic diagram of E-UMTS network structure as one example of a wireless communication system.

FIG. 1 is a diagram illustrating a network structure of an evolved universal mobile telecommunications system (E-UMTS) which is an example of a wireless communication system. The E-UMTS is an evolved version of the conventional UMTS, and its basic standardization is in progress under the 3rd generation partnership project (3GPP). The E-UMTS may be referred to as a long term evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a user equipment (UE), base stations (eNode B; eNB), and an access gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments (UEs). Different cells may be set to provide different bandwidths. Also, one base station controls data transmission and reception for a plurality of UEs. The base station transmits downlink (DL) scheduling information of downlink data to the corresponding UE to notify the corresponding UE of time and frequency domains to which data will be transmitted and information related to encoding, data size, and hybrid automatic repeat and request (HARQ). Also, the base station transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the base stations. A core network (CN) may include the AG and a network node or the like for user registration of the UE. The AG manages mobility of the UE on a tracking area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

The following technology may be used for various wireless access technologies such as code division multiple access (CDMA), frequency division multiple access (FDMA), time division multiple access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink (DL) and SC-FDMA in an uplink (UL). LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 2:
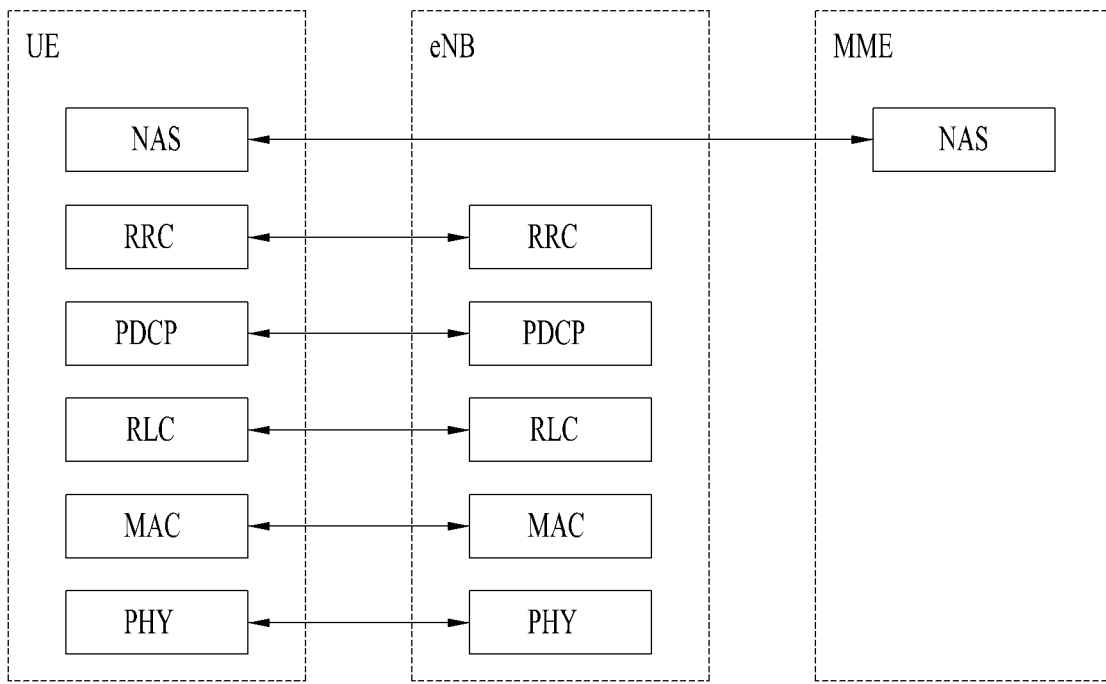
FIG. 2 is a diagram illustrating structures of a control plane and a user plane of a radio interface protocol between a user equipment and E-UTRAN based on the 3GPP radio access network standard.
Figure 2:
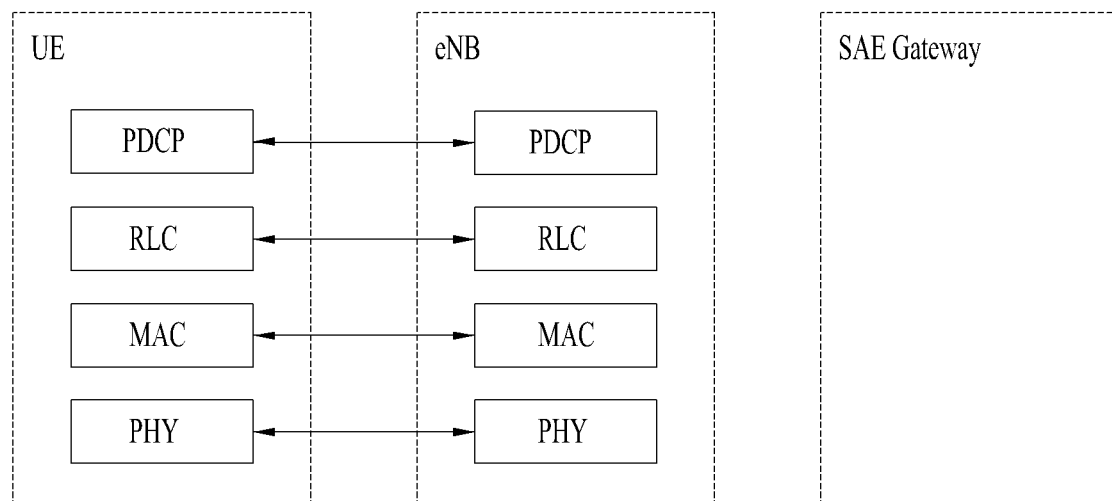

FIG. 2 is a diagram illustrating structures of a control plane and a user plane of a radio interface protocol between a user equipment (UE) and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a DL, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a base station eNB is set to one of bandwidths of 1.4, 3, 5, 10, 15, and 20 MHz and provides a DL or UL transmission service to several UEs. At this time, different cells may be set to provide different bandwidths.

As DL transport channels carrying data from the network to the UE, there are provided a broadcast channel (BCH) carrying system information, a paging channel (PCH) carrying paging message, and a DL shared channel (SCH) carrying user traffic or control messages. Traffic or control messages of a DL multicast or broadcast service may be transmitted via the DL SCH or an additional DL multicast channel (MCH). Meanwhile, as UL transport channels carrying data from the UE to the network, there are provided a random access channel (RACH) carrying an initial control message and an UL shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
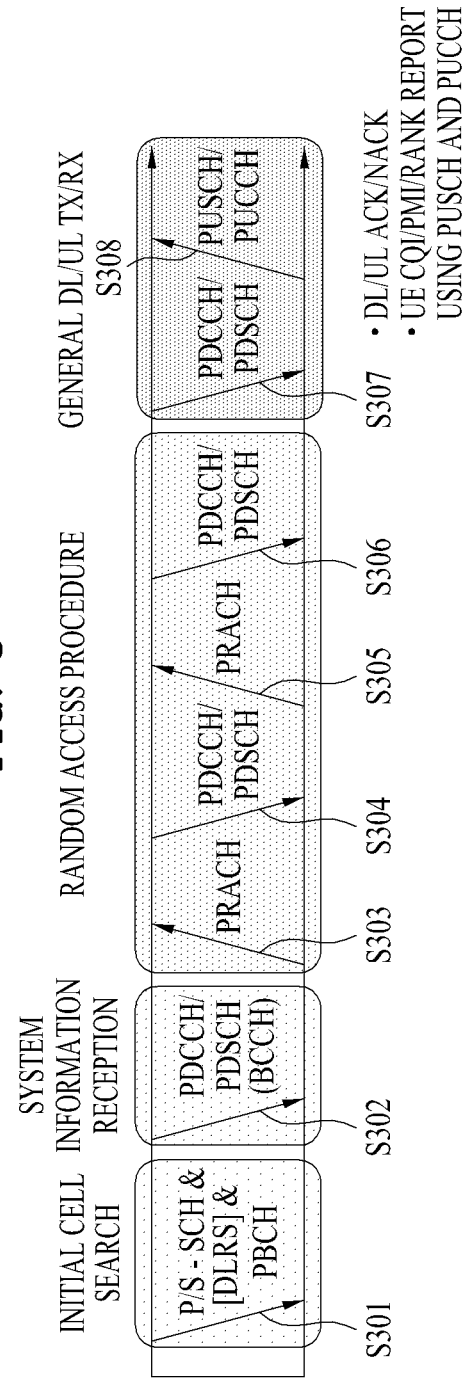
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The UE performs initial cell search such as synchronizing with the base station when it newly enters a cell or the power is turned on at step S301. To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a DL channel status by receiving a DL reference signal (DL RS) at the initial cell search step.

The UE which has finished the initial cell search may acquire more detailed system information by receiving a physical DL shared channel (PDSCH) in accordance with a physical DL control channel (PDCCH) and information carried in the PDCCH at step S302.

Afterwards, the UE may perform a random access procedure (RACH) according to steps S303 to S306 to complete access to the base station. To this end, the UE may transmit a preamble through a physical random access channel (PRACH) (S303), and may receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical DL control channel and the physical DL shared channel corresponding to the physical DL control channel.

The UE which has performed the aforementioned steps may receive the physical DL control channel (PDCCH)/physical DL shared channel (PDSCH) (S307) and transmit a physical UL shared channel (PUSCH) and a physical UL control channel (PUCCH) (S308), as a general procedure of transmitting UL/DL signals. Control information transmitted from the UE to the base station will be referred to as UL control information (UCI). The UCI includes hybrid automatic repeat and request acknowledgement/negative-ack (HARQ ACK/NACK), scheduling request (SR), channel state information (CSI), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes channel quality indicator (CQI), precoding matrix indicator (PMI), rank indication (RI), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
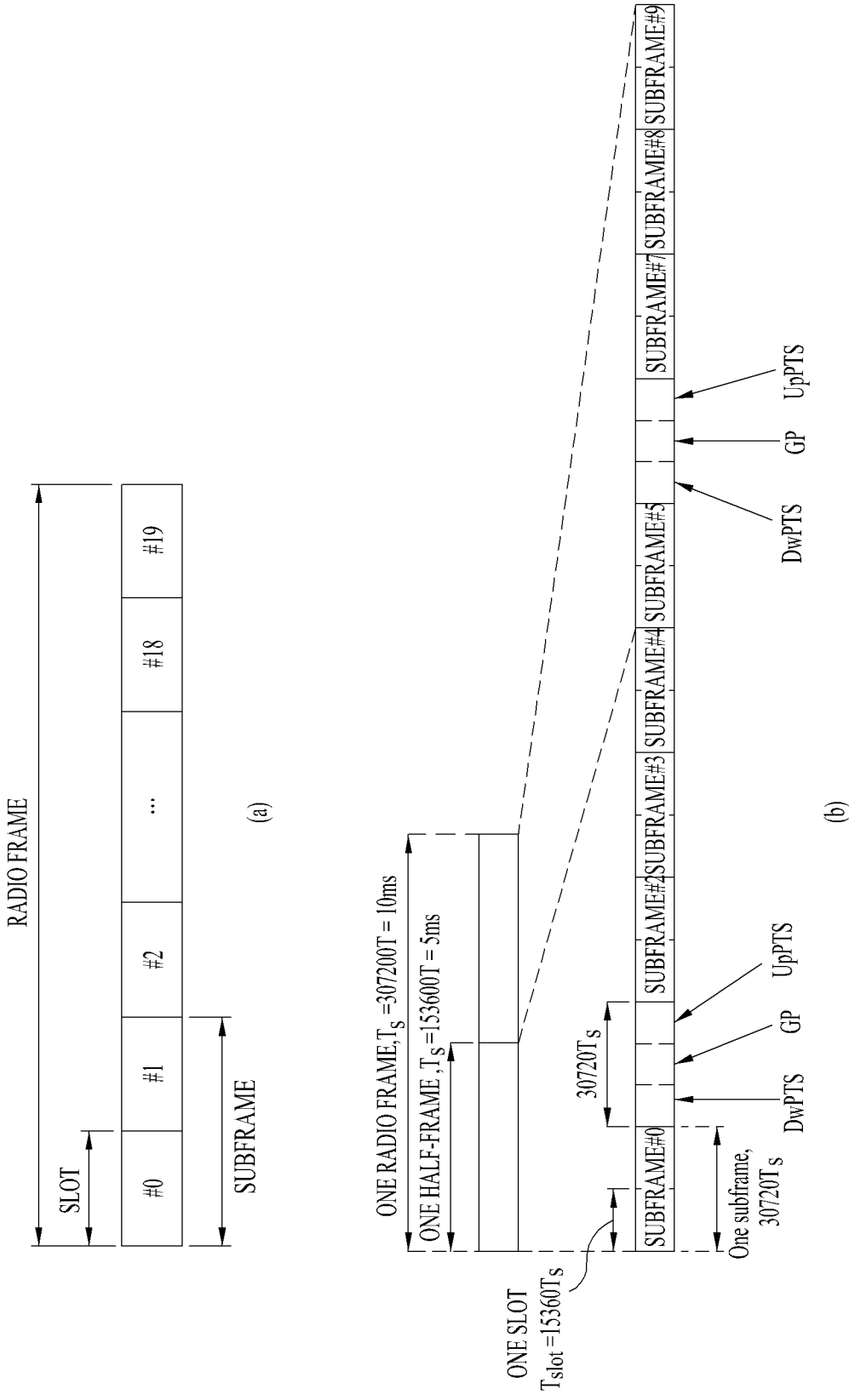
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, UL/DL data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The DL radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a DL, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical DL control channel (PDCCH), and the other OFDM symbols may be allocated to a physical DL shared channel (PDSCH).

FIG. 4(b) illustrates the structure of a type-2 radio frame. The type-2 radio frame includes two half frames, each of which has 4 normal subframes including 2 slots and a special subframe including a downlink pilot time slot (DwPTS), a guard period (GP), and an uplink pilot time slot (UpPTS).

In the special subframe, the DwPTS is used for initial cell search, synchronization, or channel estimation on a UE. The UpPTS is used for channel estimation and acquisition of uplink transmission synchronization for a UE in an eNB. That is, the DwPTS is used for downlink transmission, and the UpPTS is used for uplink transmission. In particular, the UpPTS is utilized for a PRACH preamble or SRS transmission. In addition, the GP is a period between uplink and downlink, which is intended to eliminate uplink interference caused by multipath delay of a downlink signal.

The current 3GPP standard document defines configuration of the special subframe as shown in Table 1 below. Table 1 shows DwPTS and UpPTS given when $T_s=1/(15000 \times 2048)$, and the other region is configured as a GP.

In the TDD system, the structures of the type-2 radio subframe, namely uplink/downlink subframe configurations (UL/DL configurations), are given as shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D denotes a downlink subframe, U denotes an uplink subframe, and S denotes the special subframe. Table 2 also shows downlink-to-uplink switch-point periodicity in uplink/downlink subframe configuration of each system.

The illustrated radio frame structures are merely illustrative, and various modifications may be made to the number of subframes included in a radio frame, the number of slots included in a subframe, or the number of symbols included in a slot.

Figure 5:
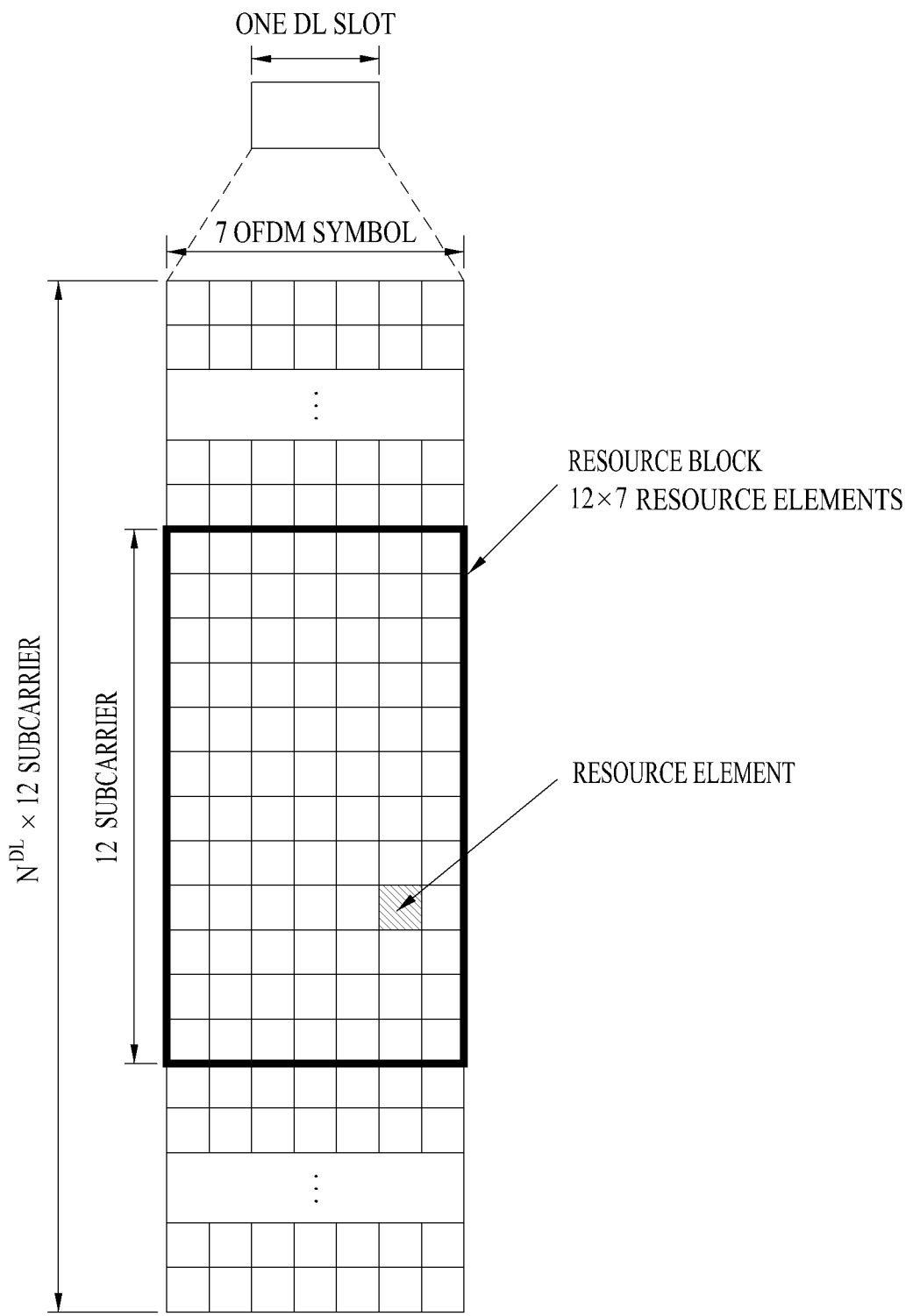
FIG. 5 is a diagram for an example of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | number $N_{RB}^{DL}$ of resource blocks included in the downlink slot depends on a downlink transmission bandwidth configured in the cell.

Figure 6:
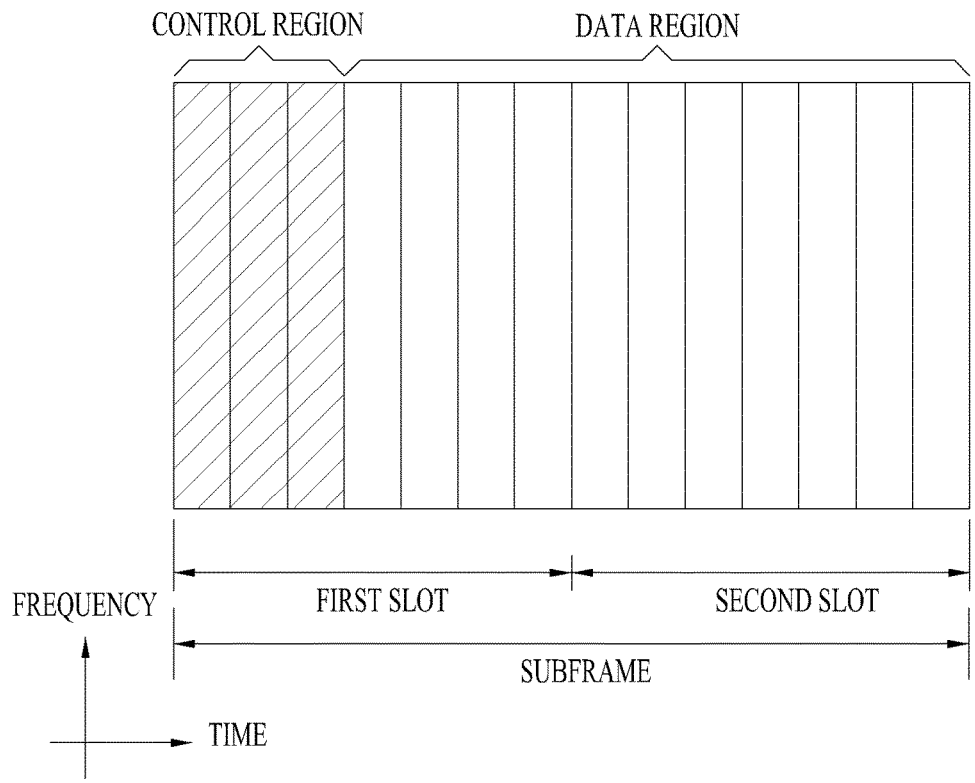
FIG. 6 is a diagram illustrating a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
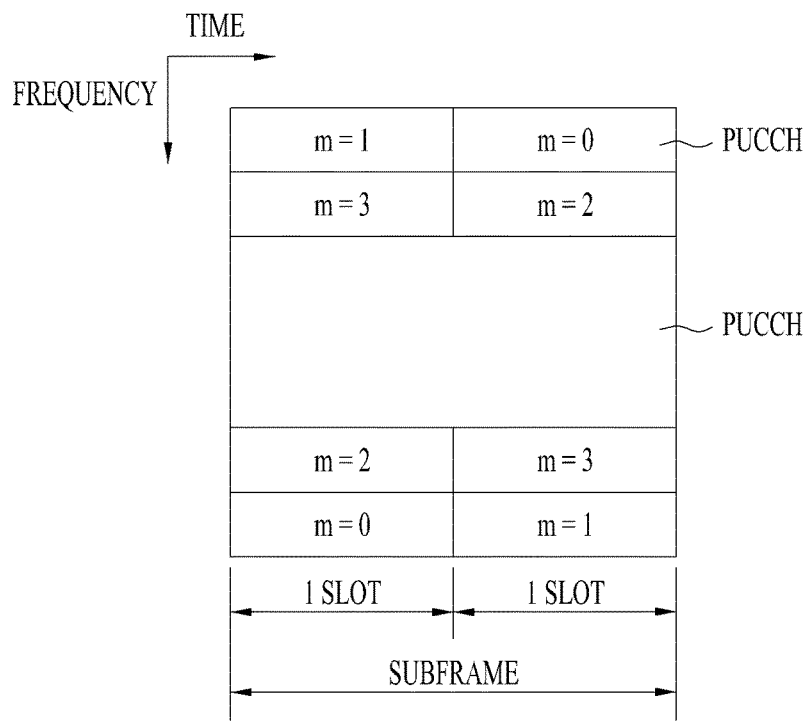
FIG. 7 is a diagram illustrating a structure of an uplink subframe used in an LTE system.

FIG. 7 is a diagram illustrating a structure of an uplink subframe used in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following, a new radio access technology system is explained. As more communication devices require greater communication capacity, the necessity for mobile broadband communication which is enhanced compared to a legacy radio access technology is emerging. And, massive MTC (Machine Type Communication), which provides various services at any time and any place by connecting a plurality of devices and objects, is also required. Moreover, designing a communication system considering a service/UE sensitive to reliability and latency has been proposed.

In particular, a new radio access technology system has been proposed as a new radio access technology considering the enhanced mobile broadband communication, the massive MTC, the URLLC (Ultra-Reliable and Low Latency Communication), and the like. In the present invention, for clarity, the new radio access technology is referred to as New RAT or NR (New Radio).

An NR system to which the preset invention is applicable supports various OFDM numerologies described in the following table. In this case, μ according to a carrier bandwidth part and cyclic prefix information can be signaled according to downlink (DL) and uplink (UL), respectively. For example, μ for a downlink carrier bandwidth part and cyclic prefix information can be signaled via higher layer signaling DL-BWP-mu and DL-MWP-cp. As a different example, μ for an uplink carrier bandwidth part and cyclic prefix information can be signaled via higher layer signaling UL-BWP-mu and UL-MWP-cp.

TABLE 3

| μ | Δf = $2^\mu \cdot 15$[kHz] | Cyclic prefix |
|---|---|---|
| 0 | 15 | Normal |
| 1 | 30 | Normal |
| 2 | 80 | Normal, Extended |
| 3 | 120 | Normal |
| 4 | 240 | Normal |

According to a frame structure of NR, DL and UL transmission are configured by a frame of a length of 10 ms. The frame can be configure by 10 subframes each of which has a length of 1 ms. In this case, the number of consecutive OFDM symbols in each subframe corresponds to $N_{symb}^{subframe,\mu} = N_{symb}^{slot} N_{slot}^{subframe,\mu}$.

Each frame can be configured by two half-frames each of which has the same size. In this case, each of the half-frames can be configured by subframes 0 to 4 and subframes 5 to 9, respectively.

For a subcarrier spacing μ, slots are numbered like $n_s^\mu \in \{0, \ldots, N_{slot}^{subframe, \mu}-1\}$ in an ascending order within a subframe and can be numbered like $n_{s,f}^\mu \in \{0, \ldots, N_{slot}^{frame, \mu}-1\}$ in an ascending order within a frame. In this case, as shown in the table below, the number of consectuve OFDM symbols ($N_{symb}^{slot}$) within a slot can be determined according to a cyclic prefic. A starting slot ($n_s^\mu$) in a subframe is aligned with a starting OFDM symbol in time domain in the same subframe. Table 4 in the following illustrates the number of OFDM symbols for a normal cyclic prefic according to a slot, a frame, and a subframe and Table 5 illustrates the number of OFDM symbols for an extended cyclic prefic according to a slot, a frame, and a subframe.

TABLE 4

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame, \mu}$ | $N_{slot}^{subframe, \mu}$ |
|---|---|---|---|
| 2 | 12 | 40 | 4 |

In NR system to which the present invention is applicable, it may be able to apply a self-contained slot structure using the abovementioned slot structure.

Figure 8:
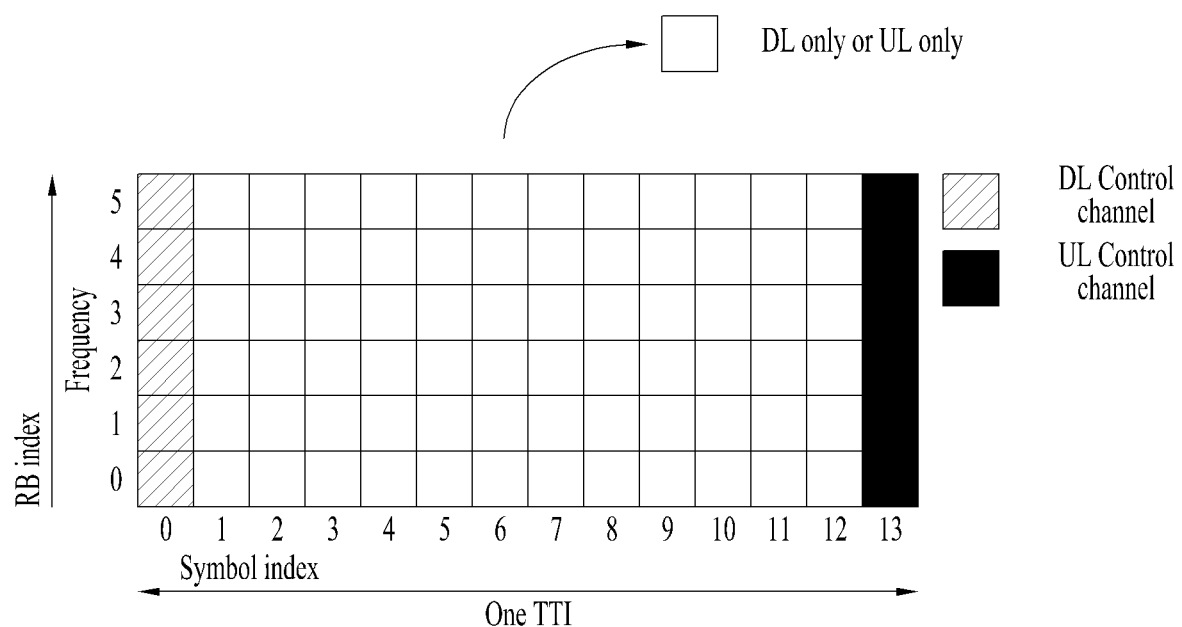
FIG. 8 is a diagram for explaining a self-contained slot structure in NR system.

FIG. 8 is a diagram illustrating a self-contained slot structure applicable to the present invention.

In FIG. 8, a region of oblique lines (e.g., symbol index=0) corresponds to a downlink control region and a region of black color (e.g., symbol index=13) corresponds to an uplink control region. The remaining region (e.g., symbol index=1~12) can be used for transmitting either downlink data or uplink data.

A base station and a UE can sequentially perform DL transmission and UL transmission in a single slot according to the structure above. The base station and the UE can transmit and receive DL data in the slot and can transmit and receive UL ACK/NACK in response to the DL data in the slot. Consequently, when a data transmission error occurs, the structure reduces time taken until data retransmission, thereby minimizing latency of final data forwarding.

In order for a base station and a UE to switch from a transmission mode to a reception mode or switch from a reception mode to a transmission mode in the self-contained slot structure, a time gap of a prescribed time length is required. To this end, a partial OFDM symbol at the timing of switching from DL to UL can be configured as a guard period (GP) in the self-contained slot structure.

In the foregoing description, although it is explained as a self-contained slot structure includes both a DL control region and a UL control region, the control regions can be selectively included in the self-contained slot structure. In other word, as shown in FIG. 8, the self-contained slot structure according to the present invention can include both the DL control region and the UL control region. Or, the self-contained slot structure can include either the DL control region or the UL control region only.

For example, slots may have various slot formats. In this case, OFDM symbols of each slot can be classified into DL (D), flexible (X), and UL (U).

Hence, a UE may assume that DL transmission occurs in 'D' and 'X' symbols only in a DL slot. Similarly, the UE may assume that UL transmission occurs in 'U' and 'X' symbols only in a UL slot.

In the following, analog beamforming is explained.

Since a wavelength becomes short in the field of Millimeter Wave (mmW), a plurality of antenna elements can be installed in the same area. In particular, since a wavelength is 1 cm in a band of 30 GHz, if a 2D array is installed in a panel of 5 by 5 cm with an interval of 0.5 lambda (wavelength), it may be able to install the total 100 antenna elements. Therefore, in the field of mmW, it is able to increase coverage or throughput by enhancing BF (beamforming) gain using a plurality of antenna elements.

In this case, each antenna port can include a transceiver unit (TXRU) to control transmission power and phase according to an antenna element. By doing so, each antenna port can perform independent beamforming according to a frequency resource.

However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 9:
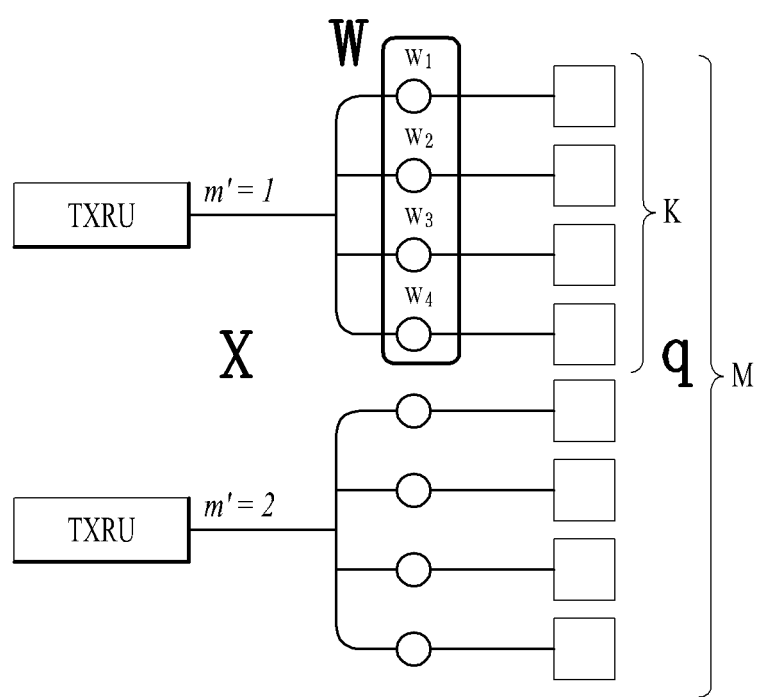
FIGS. 9 and 10 are diagrams for explaining a connection scheme between a TXRU (Transceiver) and an antenna element.
Figure 10:
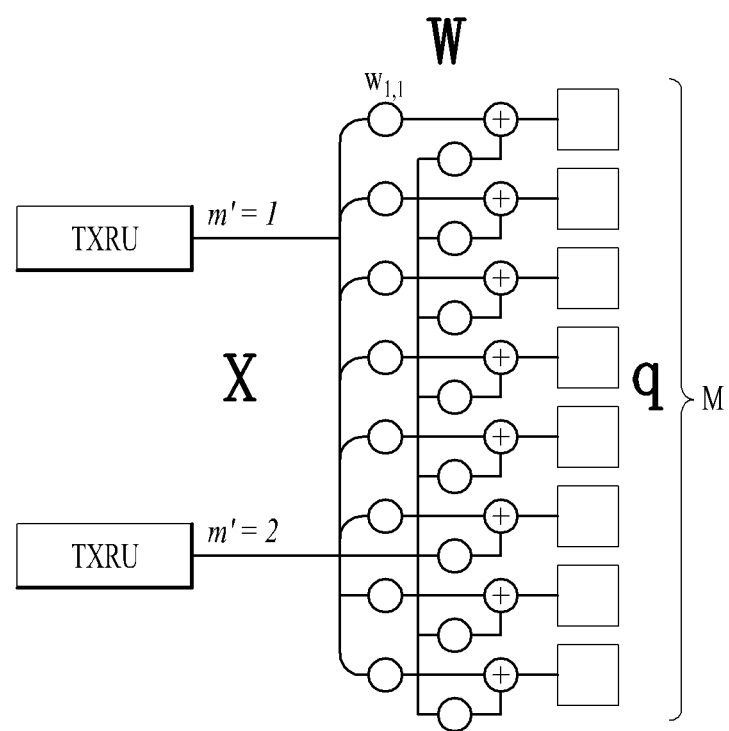

FIGS. 9 and 10 are diagrams for explaining a connection scheme between a TXRU (Transceiver) and an antenna element. In this case, a TXRU virtualization model illustrates a relationship between an output signal of a TXRU and an out signal of an antenna element.

FIG. 9 illustrates that TXRU is connected to a sub-array. In this case, the antenna elements are connected to only one TXRU.

Unlike FIG. 9, FIG. 10 illustrates that TXRU is connected to all antenna elements. In this case, the antenna elements are connected to all TXRUs. In this case, in order to make antenna elements to be connected to all TRXUs, as shown in FIG. 8, it is necessary to have an additional adder.

In FIGS. 9 and 10, W indicates a phase vector multiplied by an analog phase shifter. That is, a direction of analog beamforming is determined by W. In this case, mapping between CSI-RS antenna ports and TXRUs may be 1-to-1 or 1-to-many.

According to the configuration of FIG. 9, it may have a demerit in that it is difficult to perform focusing of beamforming. On the other hand, it may have a merit in that it is able to configure the entire antennas with low cost.

According to the configuration of FIG. 10, it may have a merit in that it is easy to perform focusing of beamforming. On the contrary, since TRXUs are connected to all antenna elements, it may have a merit in that total cost increases.

In case of using a plurality of antennas in NR system to which the present invention is applicable, it may be able to apply a scheme of hybrid beamforming corresponding to a combination of digital beamforming and analog beamforming. In this case, the analog beamforming (or RF (Radio Frequency) beamforming) corresponds to an operation of performing precoding (or combining) at an RF end. In the hybrid beamforming, each of a baseband end and an RF end performs precoding (or combining). By doing so, it may have a merit in that it is able to have performance as much as performance of digital beamforming while reducing the number of RF chains and the number of D/A (Digital-to-Analog) (or A/D (Analog-to-Digital) converters.

For clarity, the hybrid beamforming structure can be represented by the N number of transceivers (TXRUs) and the M number of physical antennas. In this case, digital beamforming for the L number of data layers to be transmitted at a transmitting end can be represented by N*L (N by L) matrix. Subsequently, the N numbers of converted digital signals are converted into analog signal via TXRUs and analog beamforming, which is represented by M*N (M by N) matrix, is applied to the converted signal.

Figure 11:
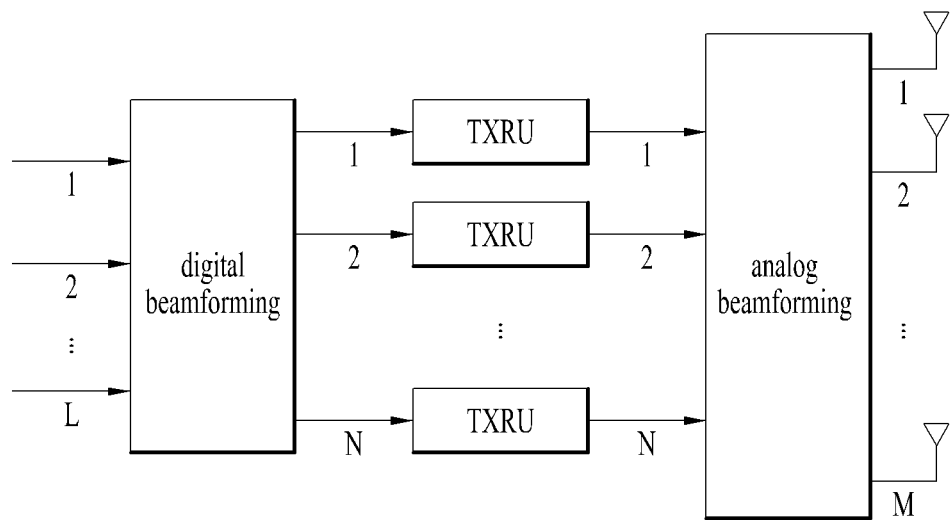
FIG. 11 is a diagram for explaining hybrid beamforming.

FIG. 11 is a diagram briefly illustrating a hybrid beamforming structure in the aspect of TXRUs and physical antennas. In FIG. 11, the number of digital beams corresponds to L and the number of analog beams corresponds to N.

In addition, NR system considers a method of more efficiently supporting beamforming to a UE located at a specific region by designing analog beamforming to be changed in a symbol unit by a base station. As shown in FIG. 11, when an antenna panel is defined by the N number of TXRUs and the M number of RF antennas, the NR system according to the present invention considers a method of introducing a plurality of antenna panels capable of applying independent hybrid beamforming.

As mentioned in the foregoing description, if a base station utilizes a plurality of analog beams, an analog beam advantageous for receiving a signal may vary according to a UE. In particular, in the NR system to which the present invention is applicable, a beam sweeping operation is considered. In particular, a base station transmits a signal by applying a different analog beam according to a symbol within a specific subframe (SF) to make all UEs have a reception opportunity.

In the present invention, when an NR UE and an NR base station are connected to an LTE base station at the same time (dual connectivity) or when an NR UE corresponds to a UE to which an LTE band is additionally assigned in UL (supplemental UL), a method of transmitting an uplink signal of NR is explained. Although the present invention is described centering on a dual connected UE or a UE to which supplemental UL is assigned, the present invention can also be used for a different scenario. For example, the present invention can be applied by considering a relationship between LTE and NR as a CA relationship in the contents of the present invention.

Basically, a dual connected UE or a UE to which supplemental UL is assigned has a room for using two UL bands for a signal DL. In both cases, since a legacy NR UL band and an LTE UL band exist together, there exists ambiguity in that it is difficult to determine whether a UL signal is transmitted on the NR UL band or the LTE UL band. The present invention related to a method of transmitting a UL signal in the situation above.

In the present invention, although such expressions as LTE downlink, LTE uplink, NR downlink, and NR uplink are used to explain the present invention, the expressions can be changed to downlink of a band X, uplink of a band Y, downlink of a band Z, and uplink of a band K, respectively, to apply the present invention to a different scenario rather than a dual connectivity situation. For example, the present invention can also be applied to a case that LTE band is used as supplemental UL. And, the present invention can be applied to all combinations using a corresponding band combination such as NR CA, and the like. The bands X, Y, Z, and K may correspond to bands including the partly same part.

Embodiment 1

When NR UL signal is transmitted on LTE band, although the NR UL signal is scheduled in LTE scheduling request resource, the NR UL signal is not transmitted in the LTE scheduling resource. This is because, since NR base station is unable to know whether or not transmission is performed in the LTE scheduling request resource, although the NR UL signal is scheduled to an NR UE in the LTE scheduling request resource, the NR base station can make the NR UE not to transmit the NR UL signal. In general, if LTE scheduling resource is configured, since it is a PUCCH region, the LTE scheduling request resource can be applied to an NR PUCCH signal only.

The NR base station transmits configuration information on the LTE scheduling request resource to the NR UE in a manner of transceiving the configuration information on the LTE scheduling request resource between NR and LTE base station via X2 interface. In case of a dual connected UE, the dual connected UE can transmit and receive configuration on LTE scheduling request resource configured by LTE via NR LTE upper layer or can transmit the configuration to the NR base station.

The configuration on the LTE scheduling request resource corresponds to UE-specific information. However, it is able to configure the configuration to cell-specifically transmit and receive all information on the LTE scheduling request resource in a dual connectivity or a supplemental UL situation.

In an LTE system, although LTE scheduling request resource configuration is allocated in a unit of a subframe, it may be able to apply the same rule to a case that the LTE scheduling request resource configuration is allocated in a unit of a slot or a symbol.

If LTE scheduling request configuration is allocated in a unit of a slot or a symbol, only a part of resources intending to transmit NR UL signal may correspond to an LTE scheduling request resource. In this case, it may be able to configure the NR UL signal to be transmitted by performing rate matching on the part only. It may be able to inform a UE of information on whether to perform the rate matching via higher layer signaling (e.g., RRC signaling) or a control channel.

Although it is represented as an LTE scheduling request resource position, it may also apply the same rule to LTE ACK/NACK resource.

And, although it is represented as an LTE scheduling request resource position, positions of signals to be protected can be configured at a time. In particular, although NR UL signal is scheduled at the positions, it may be able to define a rule that the NR UL signal is not to be transmitted at the positions.

If a UE fails to transmit NR UL signal due to LTE signal to be protected, it may be able to inform the UE of information on whether the NR UL signal is transmitted again at certain timing or dropped via a control channel or higher layer signaling (e.g., RRC signaling).

If NR UL signal is allowed to be transmitted in LTE scheduling request resource, power is checked only using on-off scheme not to detect a signal at the timing of performing scheduling request demodulation in LTE base station, and whether or not a modulated signal is transmitted is determined at the time of actually transmitting a scheduling request, although the NR UL signal and a scheduling request are transmitted together, it is able to detect the scheduling request. For example, when a scheduling request is transmitted, if a distance difference between a modulated signal and an estimated signal is equal to or less than a prescribed value, it can be determined as the scheduling request has been transmitted.

Embodiment 2

According to embodiment 2 of the present invention, when NR UL signal is scheduled on LTE band, timing (or frequency position) at which PUSCH is scheduled or timing (or frequency position) at which ACK/NACK is scheduled can be indicated by a control channel or can be semi-statically defined via higher layer signaling (e.g., RRC signaling). In this case, in may be able to separately indicate a carrier (or band) at which PUSCH or ACK/NACK is scheduled (via a control channel or RRC signaling).

For example, a base station can indicate one selected from among carriers described in the following.

A. LTE carrier
B. NR carrier
C. Both (i.e., LTE carrier and NR carrier)

In particular, the base station can indicate a carrier on which PUSCH or ACK/NACK is transmitted among LTE carrier, NR carrier, or both the LTE carrier and the NR carrier.

The base station can indicate both of the carriers (i.e., C) for reliability. In this case, it is able to repeatedly transmit a message on the two carriers. Or, it may be able to transmit the message on the two carriers by dividing the message. Information on whether the message is repeated or divided can be informed by a control channel or higher layer (e.g., RRC signaling).

Embodiment 3

According to embodiment 3 of the present invention, when NR UL signal is scheduled on LTE band, NR and LTE UL may use a different numerology (i.e., a numerology having different subcarrier spacing). In this case, timing (or frequency position) at which PUSCH is scheduled or timing (or frequency position) at which ACK/NACK is scheduled can be indicated by a control channel or can be semi-statically defined by higher layer signaling (e.g., RRC signaling). In this case, it may be able to indicate a unit of a TTI (transmission time interval) assumed on LTE carrier (via a control channel or RRC signaling) separately or together.

And, it may be able to indicate transmission timing (via a control channel or RRC signaling) separately or together. For example, it may be able to indicate a symbol or a slot in which transmission is performed in a subframe.

Embodiment 4

As mentioned earlier in the embodiment 2 and the embodiment 3, when NR UL signal is scheduled on LTE band (or NR band), it may be able to configure a plurality of sets for UL timing, transmission numerology, and the like via RRC configuration and a control channel can indicate a set from among a plurality of the sets. In this case, parameters described in the following can be included in a set.

A. Transmission numerology

B. A TTI unit for UL transmission timing (When transmission is performed at a certain TTI, it means a single TTI unit. If a plurality of TTIs are defined in a manner of being bundled, for example, if three or four symbols appear in turn, it may correspond to a TTI pattern.)

C. Transmission carrier

D. Reference signal structure (e.g., LTE UL DMRS or NR DMRS). In this case, values related to a sequence generation parameter of a reference signal can also be included. This is because, when LTE signal and a reference signal parameter occupy a resource together, it is necessary to control the reference signal parameter to maintain orthogonality between DMRSs. Or, a symbol position of a DMRS can also be included. This is because, when LTE signal and a DMRS occupy a resource together, it is necessary to orthogonally transmit the DMRS by placing the DMRS on the same position between LTE and NR. In order to place the DMRS on the same position between LTE and NR, it may shift a frame boundary of the NR. In this case, the shifting operation can be indicated via RRC configuration different from the parameters described in the embodiment 4 or can be indicated by an indication different from the indication of the embodiment 4.

E. Precoding information. When a position is different between LTE and NR, although LTE and NR occupy the same resource, it may be able to configure precoding to make beams to be separated. To this end, precoding information of each UE can be exchanged between LTE and NR. The precoding may become precoding information less influencing on a different base station or precoding information of which a signal received by each base station is big.

Embodiment 5

If LTE and NR perform UL transmission at the same time in the same resource, it may be able to indicate MU MIMO (multi-user multiple-input and multiple-output) to be performed. Or, it may be able to configure MU-MIMO to be performed by PUCCH and PUSCH at a position of PUSCH only when PUSCH/PUCCH simultaneous transmission is not performed.

For example, a DMRS is transmitted at the same position between LTE and NR and it may be able to configure sequences to be orthogonal to each other. In this case, in order to place the DMRS on the same position between LTE and NR, it may be able to shift a frame boundary of the NR.

In this case, the shifting operation can be indicated via RRC configuration or an indication of a control channel.

When a position of NR is different from a position of LTE base station due to the application of precoding of each signal, it may be able to configure beams to be separated. To this end, precoding information of a UE can be exchanged between LTE and NR.

Or, it may be able to configure a UE to recognize MU-MIMO situation and inform each base station of the MU-MIMO situation when the UE performs transmission. Or, a base station can indicate a UE to perform transmission in MU-MIMO situation via RRC configuration or a control channel.

Embodiment 6

In embodiment 6, a piggyback rule is explained. In case of a dual connected UE, both LTE PUSCH and NR UCI (Uplink Control Information) can be scheduled on LTE band. In this case, it may be able to configure the NR UCI to use ACK/NACK resource position only while following a piggyback rule of LTE PYSCH/PUCCH. This is because, since PUSCH is punctured in ACK/NACK resource only, although LTE base station does not know whether or not piggyback is performed, the LTE base station can perform demodulation on the PUSCH.

If piggyback is performed on a resource rather than an ACK/NACK resource position, it may be able to perform puncturing on PUSCH at a position of the resource. When rate matching is performed on PUSCH, if LTE base station does not know whether or not piggyback is performed, the LTE base station fails to perform LTE PUSCH demodulation.

Or, a UE may inform an NR base station of information on whether or not piggyback is performed. The NR base station demodulates NT UL signal according to a piggyback rule. In this case, in order to indicate information on whether or not piggyback is performed, it may be able to transmit an additional sequence orthogonal to a DMRS in a UL transmission subframe. And, in order to indicate information on whether or not piggyback is performed, a UE can inform NR base station of the information via signaling between the timing at which scheduling is made and the timing at which an UL signal is transmitted. A resource for the signaling can be indicated to the UE via a DL control channel or RRC signaling.

Or, it may be able to configure the UE to inform the NR base station of the information on whether or not piggyback is performed without following the LTE piggyback rule. And, the NR and the LTE base statin can demodulate a UL signal according to the piggyback rule shared between the NR and the LTE base station.

Or, if the piggyback is performed, the NR base station can perform channel estimation for demodulation via a DMRS transmitted for the LTE. Or, it may separately transmit NR DMRS at LTE PUSCH position and LTE PUSCH is punctured at the position.

Or, it may use LTE PUSCH and NR PUCCH in a symbol unit by performing TDM (Time Division Multiplexing) on the LTE PUSCH and the NR PUCCH. In this case, the LTE PUSCH is punctured in time at which the NR PUCCH is transmitted and the NR PUCCH can be transmitted in a PUCCH region.

Or, LTE PUSCH is transmitted and NR PUCCH can be dropped. The timing at which the dropped NR PUCCH is transmitted again can be indicated via a control channel or higher layer signaling (e.g., RRC signaling).

Or, it may be able to transmit LTE PUSCH and NR PUCCH in a form of MU-MIMO by applying precoding to the LTE PUSCH and the NR PUCCH. In this case, it may be able to transmit the NR PUCCH and the LTE PUSCH in a form of superposition by sharing all or a part of resources of the NR PUCCH and the LTE PUSCH. To this end, precoding information of a UE can be exchanged between the LTE and the NR. Or, it may be able to configure sequences to be orthogonal to each other by changing a parameter while a DMRS position is placed on the same position between the LTE and the NR transmission. In order to place the DMRS position on the same position, it may be able to shift a frame boundary of the NR. In this case, the shifting operation can be indicated via RRC configuration or an indication of a control channel.

Unlike the embodiment 6, both NR PUSCH and LTE UCI can be scheduled on LTE band. In this case, although it is able to basically apply a scheme similar to the embodiment 6, since it is difficult for the LTE to know information on whether or not piggyback is performed, the LTE UCI is transmitted and the NR PUSCH can be dropped. The timing at which the dropped NR PUSCH is transmitted again can be indicated via a control channel or higher layer signaling (e.g., RRC signaling).

Embodiment 7

A PDCCH order is explained in the embodiment 7. In general, if sync information is not matched, a base station transmits a PDCCH order to a UE to indicate the UE to transmit RACH (random access channel). In this case, having received the PDCCH order, since the UE follows a contention free random access procedure, the UE transmits a random access preamble to the base station. The base station transmits a random access response to the UE and provides information on TA (Timing Advance) to the UE. In order to transmit ACK/NACK in response to the information on the TA, the base station schedules PUSCH to the UE.

The operation above has no significant problem in a current LTE operation. However, in case of NR UE to which LTE band is assigned by supplemental UL, ambiguity occurs on the NR UE. In particular, it is difficult for the NR UE to determine whether transmission is to be performed in NR UL or LTE UL.

According to the present invention, it may be able to perform a PDCCH order-related RACH operation in consideration of operations 7-A to 7-D described in the following.

7-A: When a base station transmits a PDCCH order to a UE, the base station can indicate a carrier as well. The carrier information can be indicated together when a time-frequency resource in which a random access preamble is transmitted is indicated. The carrier information can indicate a carrier among two carriers. Or, the carrier information can indicate both of the two carriers such that signals can be transmitted on both of the two carriers.

7-B: When the UE transmits a random access preamble, the UE can transmit the random access preamble on the carrier indicated by the operation of 7-A.

7-C: The base statin transmits a random access response to the UE in response to the random access preamble. In this case, the base station additionally transmits carrier information to the UE to designate a carrier for performing 7-D operation to make the UE transmit ACK/NACK in response to the 7-C operation. The carrier information can indicate a carrier among two carriers. Or, the carrier information can indicate both of the two carriers such that signals can be transmitted on both of the two carriers.

7-D: If a carrier on which ACK/NACK is transmitted in response to the 7-C operation is indicated according to the 7-C operation, the UE transmits ACK/NACK on the carrier. Otherwise, the UE transmits ACK/NACK on a carrier used in the 7-B operation.

In the embodiment 7, although it is able to indicate carrier information in the 7-A operation and the 7-C operation, it may be able to inform the UE of a carrier to be used for transmission in the 7-B operation and the 7-D operation via higher layer signaling (e.g., RRC signaling). In this case, it may be able to inform the UE of a carrier for the 7-B operation and a carrier for the 7-D operation, respectively. Or, it may be able to inform the UE of a single carrier only under the assumption that transmission is performed on the same carrier. Or, it may be able to indicate the UE to perform the 7-B operation and the 7-D operation on the two carriers. When the 7-B operation or the 7-D operation is performed on the two carriers, a signal can be repeatedly transmitted on the two carriers for each of the operations. Or, a signal can be transmitted on the two carriers by dividing the signal. Information on whether a signal is repeated or divided can be informed by a control channel or higher layer (e.g., RRC signaling).

According to the embodiment 7, the operations 7-A to 7-D are described by specific terms used in LTE such as a PDCCH order, a random access preamble, a random access response, and the like. However, an operation of the same form can be differently expressed in NR and the present invention can also be applied to the operation. For example, the 7-A operation may correspond to an operation for transmitting RACH to check synchronization when synchronization is not matched. The 7-B operation may correspond to an operation of transmitting RACH according to the operation 7-A. The 7-C operation may correspond to an operation of indicating TA via the RACH of the 7-B operation. The 7-D operation may correspond to an operation of transmitting ACK/NACK response in response to the 7-C operation.

Moreover, since there are one DL and two ULs in supplemental UL environment, it is necessary to determine a UL on which PUSCH and PUCCH are to be transmitted. As a simple method, PUSCH and PUCCH are transmitted on a single carrier and the carrier can be determined according to a DL RSRP threshold. Or, a base station can determine the carrier via RRC configuration or MAC CE.

In the case where the PRACH transmission is determined according to the downlink RSRP threshold or is designated by RRC signaling, carrier on which PUCCH and PUSCH are transmitted can also be used for transmitting PRACH.

Embodiment 8

If a carrier to be transmitted is designated via RRC signaling or MAC CE (MAC Control Element), a time section ranging from the timing at which the RRC signaling or the MAC CE is forwarded to a UE to the timing at which the RRC signaling or the MAC CE is checked is ambiguous in the aspect of a base station. Hence, the embodiment 8 proposes operations 8-A to 8-C.

If a carrier on which PUCCH and PUSCH (or PRACH as well) are to be transmitted is indicated to a UE via RRC configuration or MAC CE, during prescribed time after the RRC configuration or the MAC CE is received, 8-A: it may use a currently used carrier and then move to the indicated carrier.

8-B: for example, if a carrier on which PUCCH and PUSCH are to be transmitted is independently configured, it may use a currently used PRACH carrier and then move to the indicated carrier.

8-C: it may use a predetermined carrier and then move to the indicated carrier. The predetermined carrier can be promised in advance or can be indicated via RRC configuration or MAC CE.

In particular, in case of using a single carrier, it is preferable that a physical cell ID of SUL (supplemental UL) is same as a physical cell ID of DL. This is because, since two ULs are used while time switching is performed, the two ULs can be managed in a manner of being regarded as single UL.

In this case, SUL and DL/UL may have different subcarrier spacing. Hence, a change can be made on scheduled PUSCH timing and HARQ ACK/NACK timing. Basically, when two ULs are used through time switching, scheduling PUSCH timing and HARQ ACK/NACK timing are indicated on the basis of DL/UL and the scheduling PUSCH timing and the HARQ ACK/NACK timing are used in a manner of being reinterpreted without additional indication for SUL. This is because, if it is assumed that time taken between PDCCH and PUSCH or time taken between PDSCH and PUCCH has no difference with SUL in UL, it is preferable to use the same scheduling PUSCH timing or the HARQ ACK/NACK timing. To this end, since UL and SUL have a different slot length, scheduled PUSCH or HARQ ACK/NACK is transmitted in a slot of SUL which appears later as much as an indication of the scheduling PUSCH timing and an indication of the HARQ ACK/NACK timing on the basis of a slot length of DL.

Embodiment 9

If a carrier on which PUSCH/PUCCH is to be transmitted is determined via RRC or MAC CE in SUL, ambiguity may occur on a periodic UL signal (e.g., periodic CSI). When a periodic signal is transmitted, if a carrier is changed between transmission periods and UL and SUL have a different numerology, it is difficult for a UE to determine a resource and a format to be used for transmission after the carrier is changed. Hence, embodiment 9 of the present invention may consider operations 9-A to 9-C described in the following.

9-A: In SUL, if PUSCH for transmitting a periodic UL signal or a carrier for transmitting PUCCH is changed in the middle of transmitting the periodic UL signal, since the carrier is changed, periodic UL signal transmission used to be transmitted on a previous carrier is not performed on a new carrier. If a carrier is returned to the carrier on which the periodic UL signal used to be transmitted, the periodic UL signal transmission is resumed.

9-B: In SUL, if PUSCH for transmitting a periodic UL signal or a carrier for transmitting PUCCH is changed in the middle of transmitting the periodic UL signal, although the carrier is changed, since the most of periodic UL signals are not channel-dependent transmission (except SRS) of the carrier, transmission of the periodic UL signal is maintained irrespective of the change of the carrier. In this case, it is necessary for a base station to set a configuration (resource configuration, transmission format configuration) for the periodic UL signal to a UE for two carriers including UL and SUL. The UE performs periodic UL signal transmission according to the configuration in accordance with the transmission carrier.

9-C. 9-A: In SUL, if PUSCH for transmitting a periodic UL signal or a carrier for transmitting PUCCH is changed in the middle of transmitting the periodic UL signal, although the carrier is changed, the periodic UL signal used to be transmitted on a previous carrier can be continuously transmitted on the previous carrier.

Moreover, SUL may be able to share a band currently used in a different RAT or a band. Meanwhile, a cell ID is used for performing data scrambling and generating a reference signal sequence to perform interference randomization. Hence, it is preferable for SUL to use a currently shared band or a cell ID of RAT in the aspect of a network.

Figure 12:
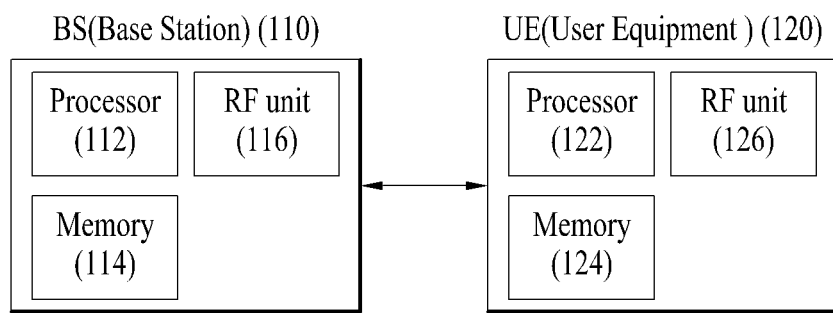
FIG. 12 is a diagram for a base station and a UE applicable to one embodiment of the present invention.

FIG. 12 is a diagram for a base station and a UE applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 12, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

A method of transmitting and receiving a signal based on LTE and NR in a wireless communication system and an apparatus therefor can be applied to various wireless communication systems.

What is claimed is:

1. A method for performing a random access procedure by a user equipment (UE) in a wireless communication system, the method comprising:
   receiving downlink control information (DCI) through a physical downlink control channel (PDCCH) on a first downlink (DL) carrier of a serving cell configured for the UE; and
   transmitting a random access preamble based on the DCI being a PDCCH order which initiates the random access procedure,
   wherein the serving cell configured for the UE comprises the first DL carrier, a first uplink (UL) carrier and a second UL carrier,
   wherein a same physical cell identifier is configured for the first DL carrier, the first UL carrier and the second UL carrier,
   wherein the second UL carrier is a supplementary uplink (SUL) carrier, and
   wherein an UL carrier for transmitting the random access preamble is determined between the first UL carrier and the SUL carrier based on UL carrier indication information included in the DCI.

2. The method of claim 1, wherein the random access preamble is based on subcarrier spacing identical to subcarrier spacing of a random access preamble transmission initiated by a radio access control (RRC) layer before the first UL carrier and the second UL carrier are configured for the UE.

3. The method of claim 1, wherein the first DL carrier and the first UL carrier are configured in a new radio technology (NR) band.

4. The method of claim 1, wherein the SUL carrier is configured in a long term evolution (LTE) band.

5. A user equipment (UE) configured to perform a random access procedure in a wireless communication system, the UE comprising:
- a transceiver; and
- at least one processor coupled with the transceiver,
- wherein the at least one processor is configured to:
  - receive downlink control information (DCI) through a physical downlink control channel (PDCCH) on a first downlink (DL) carrier of a serving cell configured for the UE; and
  - transmit a random access preamble based on the DCI being a PDCCH order which initiates the random access procedure,
- wherein the serving cell configured for the UE comprises the first DL carrier, a first uplink (UL) carrier and a second UL carrier,
- wherein a same physical cell identifier is configured for the first DL carrier, the first UL carrier and the second UL carrier,
- wherein the second UL carrier is a supplementary uplink (SUL) carrier, and
- wherein an UL carrier for transmitting the random access preamble is determined between the first UL carrier and the SUL carrier based on UL carrier indication information included in the DCI.

6. An apparatus configured to control a user equipment (UE) to perform a random access procedure in a wireless communication system, the apparatus comprising:
- at least one processor; and
- at least one memory operably connectable to the at least one processor and storing instructions that, based on executed, cause the at least one processor perform operations comprising:
  - receiving downlink control information (DCI) through a physical downlink control channel (PDCCH) on a first downlink (DL) carrier of a serving cell configured for the UE; and
  - transmitting a random access preamble based on the DCI being a PDCCH order which initiates the random access procedure,
- wherein the serving cell configured for the UE comprises the first DL carrier, a first uplink (UL) carrier and a second UL carrier,
- wherein a same physical cell identifier is configured for the first DL carrier, the first UL carrier and the second UL carrier,
- wherein the second UL carrier is a supplementary uplink (SUL) carrier, and
- wherein an UL carrier for transmitting the random access preamble is determined between the first UL carrier and the SUL carrier based on UL carrier indication information included in the DCI.

* * * * *